Patented Jan. 5, 1937

2,066,622

UNITED STATES PATENT OFFICE 2,066,622

PROCESS OF MAKING FORMALDEHYDE

Rudolph L. Hasche, Whitefish Bay, Wis., assignor to A. O. Smith Corporation, Milwaukee, Wis., a corporation of New York No Drawing. Application April 30, 1934, Serial No. 723,163

8 Claims. (Cl. 260—138)

This invention relates to the manufacture of formaldehyde by the partial oxidation of ethylene.

An object of the invention is to provide a method for the production of formaldehyde which permits the formaldehyde to be recovered in the form of relatively concentrated solutions.

Another object of the invention is to provide a method in which the formaldehyde formed by the partial oxidation of ethylene can be recovered in part in the form of a solid, paraformaldehyde.

A further object of the invention is to provide a method for the production of formaldehyde which gives a relatively pure product containing only minor amounts of other aldehydes, ketones, alcohols, and acids.

In accordance with the invention, ethylene is mixed with oxygen or a gas which contains oxygen, preferably air, and is passed over a solid catalyst. Ethylene has been found to be particularly desirable for use in this process since, under suitable conditions which are hereinafter described, it gives relatively pure formaldehyde as the product of partial oxidation. Water, carbon monoxide, and carbon dioxide are also formed, but only relatively small or negligible amounts of ketones, acids, and alcohols, or other aldehydes than formaldehyde.

Ethylene can be separated from refinery gases by well-known processes, or from the gases produced by cracking ethane, which can be obtained from natural gas. Pure ethylene can be used in this process for making formaldehyde, or a mixture of gases which contains ethylene. Refinery gases and cracked ethane contain an appreciable percentage of ethylene along with other hydrocarbons, and may be mixed with air and passed over a catalyst to produce formaldehyde. For the production of the more concentrated solutions of formaldehyde, it is preferable, however, to first separate the ethylene from the mixture of gases in which it is contained, then mix the substantially pure ethylene with air and pass it over the catalyst. Less water is produced in the reaction when ethylene is first separated from the mixture of gases obtained by cracking ethane than when the entire mixture is admixed with air and passed over the catalyst, and there is consequently less dilution of the formaldehyde with water produced in the reaction.

A suitable catalyst for the reaction is molybdenum oxide on silica gel. Such a catalyst may be prepared by pouring a cold solution of ammonium molybdate on activated silica gel of any desired particle size prepared by commercial methods. Without draining away any of the excess solution, the mass of gel and ammonium molybdate solution is slowly evaporated to dryness over a steam bath. The gel is constantly agitated during the drying to insure uniform impregnation as the evaporation progresses. After this preliminary drying, the material is heated in a current of air to remove ammonia, the heating being so regulated that the ammonia liberation is distributed as uniformly as possible between the temperatures of 100° C. and 400° C. The catalyst is then subjected to further treatment by being heated in air to a temperature of about 575–585° C. for a period of from twenty to thirty minutes, and is then ready to be used for the partial oxidation of ethylene to produce formaldehyde. Catalysts having valuable properties are obtained by this method of preparation when the quantity of molybdenum oxide, $MoO_3$, lies between about 13% and 20% of the weight of the gel. When the weight of molybdenum oxide used is less than about 13% of the weight of the gel, less active or inactive catalysts are produced; while when it is in excess of about 20% of the weight of the gel, there is no corresponding advantage in activity or durability. Other suitable catalysts for the reaction consist of silica gel in which there are incorporated the oxides of tungsten, vanadium, or chromium, either alone or mixed in combination with each other or with iron, copper, zinc, or aluminum, or their oxides.

Temperatures from about 415° C. to 500° C. are suitable for carrying out the partial oxidation of ethylene to formaldehyde, the most desirable temperature for any particular case depending somewhat upon the particular catalyst used, the ratio of gas to air, and the rate at which the gaseous mixture is passed over the catalyst. In general, it is found that as the space velocity is increased, the temperature should also be increased to secure the optimum results. Examples of temperatures found to give excellent results for specific conditions are found in the examples which are hereinafter given. In any case, the reaction should be conducted under substantially isothermal conditions. Heat is liberated during the reaction, and if no provision is made for removing heat from the catalyst chamber, the temperature will rise so high that the products of complete combustion will be formed in predominating quantity and the yield of formaldehyde will be correspondingly reduced. The temperature of the catalyst chamber may be controlled by making the catalyst tube of small diameter in order that heat may be readily transferred to a suitable medium of high heat capacity which surrounds the catalyst tube and is maintained at a suitable temperature for the reaction. Control of temperature is also afforded by mixing with the reaction mixture an inert gas which takes no part in the reaction, but which increases the heat capacity of the system and causes a lower temperature rise than would occur in its absence.

The reaction mixture should contain in excess of three volumes of air for each volume of ethylene, and perferably in excess of five volumes of air for each volume of ethylene. The higher ratios of air to ethylene lead to higher conversions of ethylene to formaldehyde. A gaseous mixture which contains three volumes of air to one volume of ethylene will contain close to six tenths volumes oxygen to one volume of ethylene, while a mixture which contains five volumes of air to one volume of ethylene will contain close to one volume of oxygen to one volume of ethylene since air contains approximately twenty per cent of oxygen by volume. This amount of oxygen, one volume to each volume of ethylene, is theoretically just sufficient to partially oxidize all the ethylene to formaldehyde.

The following specific examples are illustrative of the way in which the process of this invention may be carried out, but it is to be understood that the invention is not limited thereto.

Example 1

A mixture of air and substantially pure ethylene in the proportion of 3.13 volumes of air to 1 volume of ethylene was passed over a molybdenum oxide, silica gel catalyst at a temperature of 420° C. and a space velocity of 288. The products of partial oxidation were removed by condensing and scrubbing apparatus and retained in suitable containers. Analysis of the products showed that the aldehydic constituents recovered were 98.5% formaldehyde and only 1.5% higher aldehydes. Ketones constituted less than 6% of the yield, and there were no alcohols or acids present. In this example, 11.5% of the hydrocarbon passing the catalyst was converted to aldehyde.

Example 2

A mixture of air and substantially pure ethylene in the proportion of 5 volumes of air to 1 of ethylene was passed over a molybdenum oxide, silica gel catalyst at a temperature of 443° C. and a space velocity of 335. The material separating out in the cooling condenser maintained at ordinary temperatures, consisted of a paste of solid paraformaldehyde and a concentrated solution of aldehydes, principally formaldehyde. No acids or alcohols were found in the product. In this case, 17% of the total hydrocarbon passed was converted to aldehyde, a substantial increase over the optimum yield obtained with a 3 to 1 ratio of air to ethylene.

Example 3

A mixture of air and substantially pure ethylene in the proportion of 8 volumes of air to 1 of ethylene was passed over a molybdenum oxide, silica gel catalyst at a temperature of 450° C. and a space velocity of 334. In this case a higher conversion of ethylene to formaldehyde was obtained than in either of the two preceding examples, 20.2% of the total hydrocarbon passed being converted to aldehyde.

The distribution of products obtained was substantially the same in all of the above three examples.

Example 4

A mixture of air and cracked gas obtained by cracking substantially pure ethane, in the proportion of approximately 10 volumes of air to 1 of cracked gas was passed over a molybdenum oxide, silica gel catalyst at a temperature of 427° C. and a space velocity of 309. The composition of the cracked gas was:

| | Percent |
|---|---|
| $CO_2$, carbon dioxide | 0.1 |
| $C_2H_4$, ethylene | 29.9 |
| $C_2H_2$, acetylene | 0.9 |
| $O_2$, oxygen | 0.4 |
| $H_2$, hydrogen | 42.4 |
| CO, carbon monoxide | 0.2 |
| $CH_4$, methane | 17.1 |
| $C_2H_6$, ethane | 6.2 |
| $C_3H_6$, propylene | 1.4 |
| $N_2$, nitrogen | 1.4 |

In this case 17.8% of the total unsaturated hydrocarbons passed was converted to aldehydes.

In each of the examples given, the conversion of hydrocarbon to aldehydes is for a single passage of the reaction mixture over the catalyst. It will be understood, however, that the invention is not limited thereto, but that several catalyst chambers may be used in series, the products of partial oxidation being removed from the gas coming from each catalyst chamber before it passes into the next. Alternatively, the gas from which the products of partial oxidation have been removed may be recirculated over the same catalyst, suitable additions of gas and air and removal of spent gas being made to maintain the desired ratio of air and gas in the reaction chamber.

I claim:

1. The method of making formaldehyde which comprises mixing ethylene with air and passing the mixture over a molybdenum oxide catalyst on a silica gel base at a temperature which will cause the partial oxidation of ethylene to formaldehyde.

2. The method of making formaldehyde which comprises mixing air with a gas which contains ethylene and passing the mixture of gases over a molydenum oxide catalyst on a silica gel base at a temperature which will cause the partial oxidation of ethylene to formaldehyde.

3. The method of making formaldehyde which comprises mixing ethylene with air in the proportion of not less than three volumes of air to one volume of ethylene, and passing the mixture over a molybdenum oxide catalyst on a silica gel base at a temperature of from about 415° C. to about 500° C.

4. The method of making formaldehyde which comprises mixing air with a gas which contains ethylene, in the proportion of not less than three volumes of air to each volume of ethylene contained in the gas, and passing the mixture over a molybdenum oxide catalyst on a silica gel base at a temperature of from about 415° C. to 500° C.

5. The method of making formaldehyde which comprises mixing air with a gas which contains ethylene, in the proportion of not less than five volumes of air to each volume of ethylene contained in the gas, and passing the mixture over a molybdenum oxide catalyst on a silica gel base at a temperature of from about 415° C. to about 500° C.

6. The method of making formaldehyde which comprises mixing ethylene with air in such proportion that there is an excess of oxygen over that which is theoretically required for the partial oxidation of all the ethylene to formaldehyde, and passing the mixture over a molybdenum oxide catalyst on a silica gel base at a temperature of from about 415° C. to about 500° C.

7. The method of making formaldehyde which comprises preparing a gaseous mixture which contains ethylene and oxygen in the proportion of not less than one volume of oxygen for each volume of ethylene, and passing the mixture over a molybdenum oxide catalyst on a silica gel base at a temperature which will effect the conversion of ethylene to formaldehyde.

8. The method of making formaldehyde which comprises mixing air with a gas which contains ethylene and passing the mixture of gases over a catalyst of silica gel in which is incorporated one of the following group of materials, molybdenum oxide, tungsten oxide, vanadium oxide, chromium oxide, mixtures of two or more of the latter three, and mixtures of one or more of said three with iron, copper, zinc, or aluminum, or oxides thereof, at a temperature which will cause the partial oxidation of ethylene to formaldehyde.

RUDOLPH L. HASCHE.